US008827518B2

(12) United States Patent
Smith et al.

(10) Patent No.: US 8,827,518 B2
(45) Date of Patent: Sep. 9, 2014

(54) UNIVERSAL TRAILER LIGHT UNIT

(75) Inventors: Thomas Smith, Winfield, IL (US); Steve Rovtar, West Chicago, IL (US); Chris Riley, Madison, IN (US)

(73) Assignee: Tiger Accessory Group, LLC, Long Grove, IL (US)

( * ) Notice: Subject to any disclaimer, the term of this patent is extended or adjusted under 35 U.S.C. 154(b) by 241 days.

(21) Appl. No.: 13/419,131

(22) Filed: Mar. 13, 2012

(65) Prior Publication Data
US 2013/0242584 A1 Sep. 19, 2013

(51) Int. Cl.
*B60Q 1/56* (2006.01)
*B60Q 1/26* (2006.01)
*B60Q 7/00* (2006.01)
*G09F 13/18* (2006.01)

(52) U.S. Cl.
USPC ........... 362/497; 362/498; 362/486; 362/546; 40/204; 40/205

(58) Field of Classification Search
USPC ......... 362/473, 475, 476, 486, 487, 497–499, 362/157, 184, 190, 191, 640, 646, 652, 656, 362/249.01, 365, 368; 40/200–211
See application file for complete search history.

(56) References Cited

U.S. PATENT DOCUMENTS

| 1,893,303 | A | 1/1933 | Philips |
| 3,858,039 | A | 12/1974 | Moore |
| 4,163,275 | A | 7/1979 | Weber et al. |
| 5,508,894 | A | 4/1996 | Payne et al. |
| 5,980,065 | A | 11/1999 | Wooderson |
| 6,693,551 | B2 * | 2/2004 | Pederson ...................... 362/800 |

* cited by examiner

*Primary Examiner* — Mariceli Santiago
(74) *Attorney, Agent, or Firm* — Greer, Burns & Crain, Ltd.

(57) ABSTRACT

A universal automotive light includes a main housing constructed and arranged for accommodating a stop/tail/turn light assembly, a pair of opposed side marker apertures disposed on either side of stop/tail/turn light assembly, and a side marker light assembly constructed and arranged for engagement in a selected one of the side marker apertures.

13 Claims, 5 Drawing Sheets

UNIVERSAL TRAILER LIGHT UNIT

BACKGROUND

The present invention relates generally to lighting devices, and more particularly to automotive light units, and especially to automotive trailer light units. Conventional aftermarket or replacement automotive trailer light units are provided in pairs. Each member of the pair includes a housing with a main stop/tail/turn (STT) lens and associated lighting circuitry. The main STT light includes at least one source of illumination, such as a bulb, LED or the like. Also provided on the housing is a side marker lens, which when the light unit is attached to the trailer or vehicle, will be placed on one of the right and left sides for providing side illumination. The side marker light in some cases shares a source of illumination with the STT lighting circuitry. Since the side marker light is intended to illuminate the respective side of the vehicle, in conventional trailer light unit assemblies, there is a specified right and left light unit in each pair. In addition, one light unit in the pair typically is provided with a license plate light, associated lens and circuitry. In many cases, the left side light unit is provided with the downward-directed license plate light.

Manufacturers of conventional trailer light units have traditionally produced specific right and left side light units, forcing them to be sold in pairs. For those customers who desire only one light unit, retailers have been reluctant to provide separate inventories of left and right trailer light units due to stocking, store space and inventory problems. As a result, many retailers only stock replacement pairs of trailer light units, forcing customers to purchase a pair of light units even when only one side unit needs replacement.

Recognizing the problem manufacturers have in being forced to create separate right and left replacement trailer light units, U.S. Pat. No. 5,980,065 discloses a replacement trailer light unit including a base housing, a light bulb assembly mountable in the housing, a main lens, and a supplemental side marker lens that is mountable within the housing on either the right or left side, depending on which side the manufacturer intends to manufacture, a right or left side light unit. In addition, a core light assembly includes a main bulb for illuminating the STT light, and an auxiliary bulb for illuminating the side marker light. The housing is configured so that the light assembly is reversible, enabling the manufacturer to selectively place the side marker light on either the left or the right side. Similarly, the auxiliary lens is placed by the manufacturer on the designated right or left side of the main lens during assembly. However, this light unit requires the manufacturer to determine prior to assembly which side, right or left the subject light will be used.

Accordingly, there is a need for a replacement or aftermarket automotive trailer light unit that is more suitable for right or left side use.

SUMMARY

The above-identified drawback of the prior art is met or exceeded by the present universal trailer light unit, which features a main housing with a stop/tail/turn (STT) lens and corresponding dedicated main light assembly, and respective left and right side marker light apertures. A single side marker light assembly is provided in the housing and is selectively mountable by the user in a designated one of the left and right side apertures.

Mounting of the side light assembly is preferably accomplished by a snap-in engagement, without the use of tools. The present side marker light assembly is preferably provided with sufficient length of connecting wire so that the light assembly can be passed from one of the side marker apertures to the other when the user needs to use the light unit on a side of the trailer that is other than the orientation of the light assemblies as provided by the manufacturer. The electrical connection to the side marker assembly is maintained with the vehicle power supply regardless of which side marker aperture is located.

Thus, the present light unit provides the advantage, with a single housing and respective components, of being selectively usable as either a right or left side trailer light unit. The election of which side the unit will be used on is controlled by the end user, not the manufacturer. Accordingly, manufacturer and retailer inventories, part numbers and manufacturing facilities are simplified. In addition, the retailer can optionally provide a pair of such lights for a full replacement set, or a single light unit that is replaceable as either a left or right side unit, as desired by the consumer.

More specifically, a universal automotive light unit includes a main housing constructed and arranged for accommodating a stop/tail/turn light assembly, a pair of opposed side marker apertures disposed on either side of the stop/tail/turn light assembly; and a side marker light assembly constructed and arranged for engagement in a selected one of the side marker apertures.

In another embodiment, a universal automotive light unit is provided, including a main housing defining an interior chamber having a first aperture constructed and arranged for accommodating a stop/tail/turn light assembly, a pair of opposed side marker apertures disposed on either side of the first aperture. A side marker light assembly is constructed and arranged for engagement in a selected one of the side marker apertures, the light assembly being provided with at least one arm for engaging a corresponding one of the side marker apertures. A cover is engaged in the one of the side marker apertures not engaged by said side marker light assembly, the interior chamber being constructed and arranged so that the side marker light assembly is disengageable from a corresponding one of the side marker apertures, and is passable through the chamber to the other of the side marker apertures for engagement therein.

DETAILED DESCRIPTION

Figure 1:
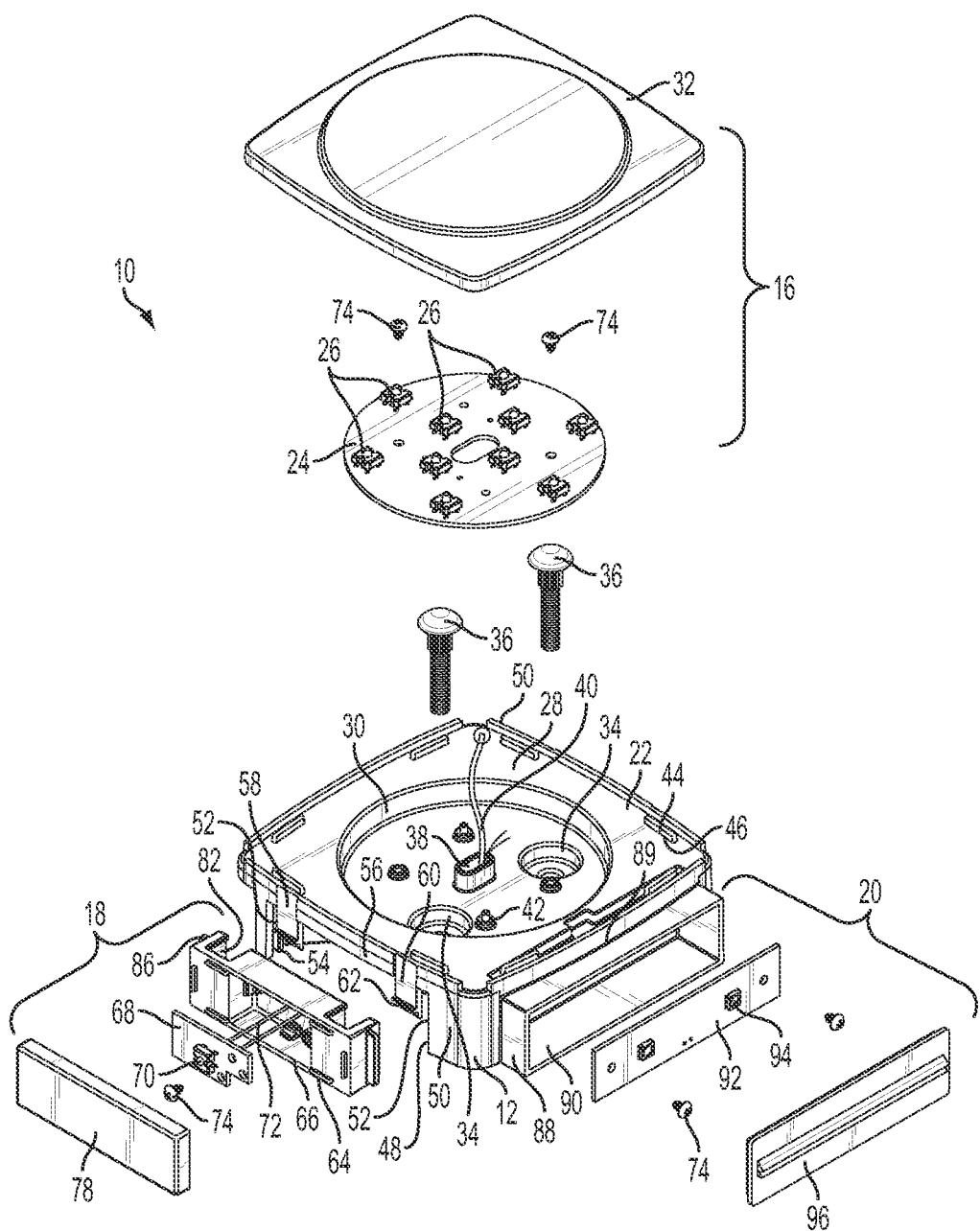
FIG. 1 is an exploded top perspective view of the present universal trailer light unit.
Figure 2:
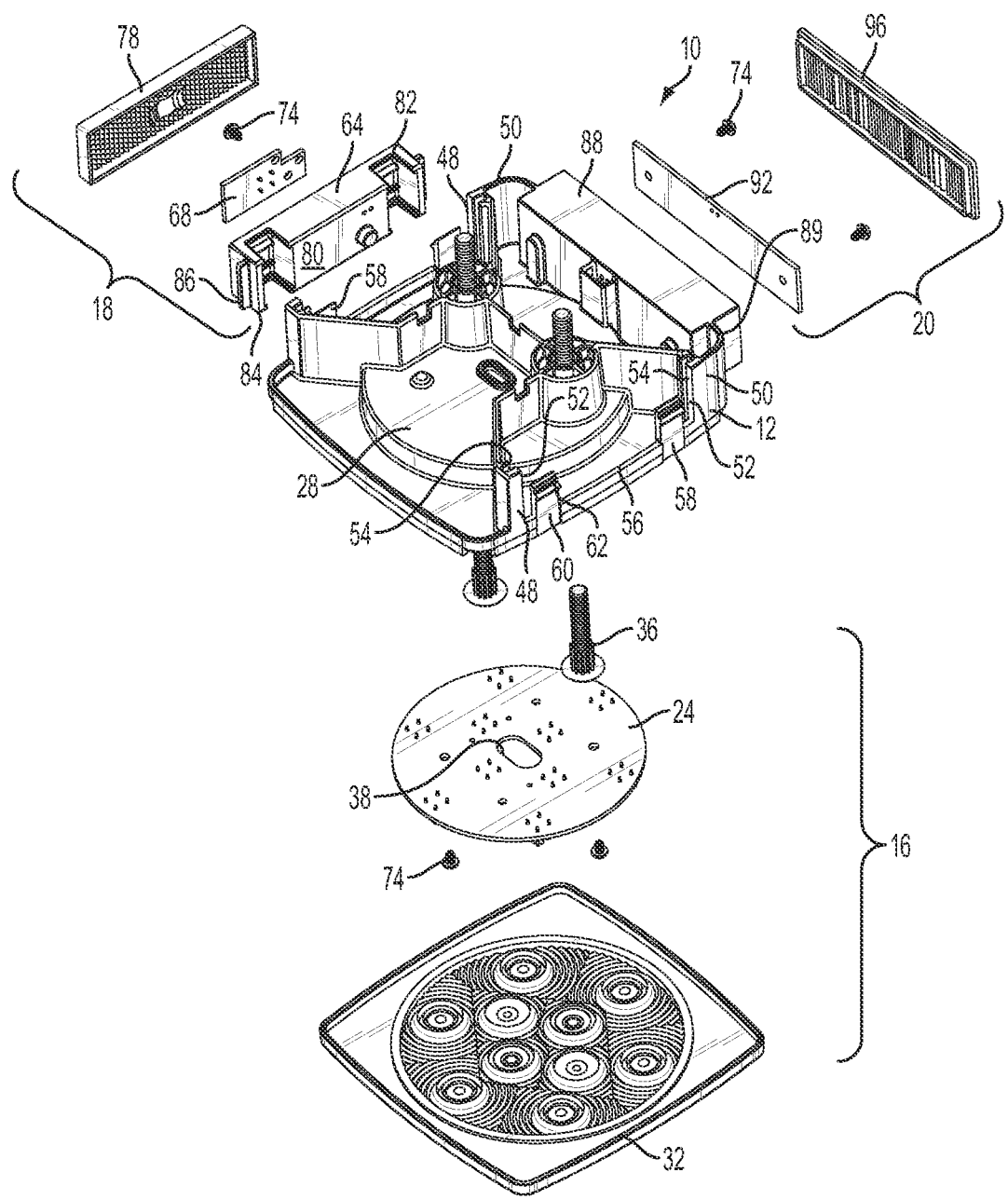
FIG. 2 is an exploded bottom perspective view of the present universal trailer light unit.
Figure 3:
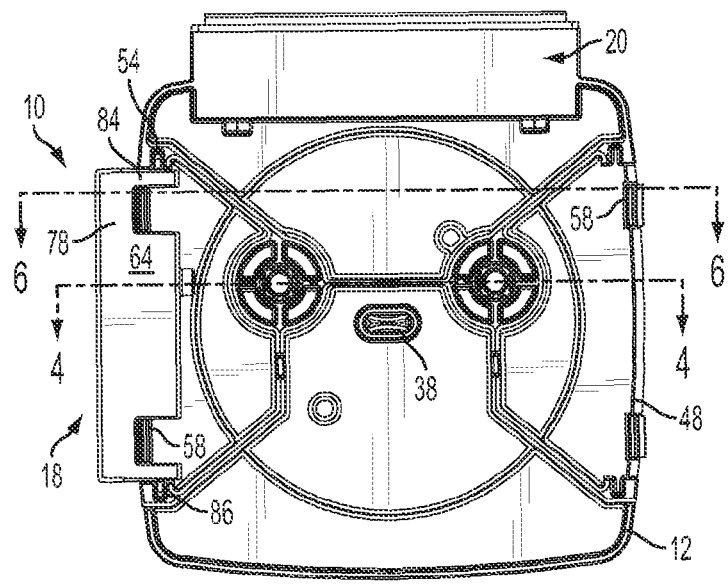
FIG. 3 is a rear elevation of the trailer light unit of FIG. 1.
Figure 4:
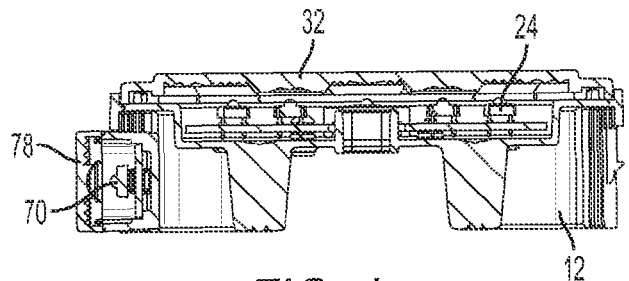
FIG. 4 is a cross-section taken along the line 4-4 of FIG. 3 and in the direction generally indicated.
Figure 5:
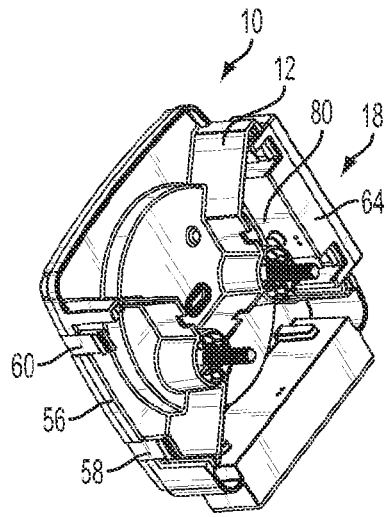
FIG. 5 is a rear perspective view of the trailer light unit of FIG. 3.

Referring to FIGS. 1 and 2, the present universal light unit is generally designated 10, and, while is preferably used for automotive uses, and particularly automotive trailers, other applications are contemplated. The present light unit includes a main housing 12 defining an interior chamber 14. While in the preferred embodiment, the main housing 12 is made of plastic, other materials are contemplated. Also, in the embodiment of FIGS. 1 and 2, the interior chamber 14 is open to the rear; however an enclosed chamber is also contemplated. In general, the main housing 12 is constructed and arranged for accommodating at least a main stop/tail/turn (STT) light assembly 16, a side marker light assembly 18 and a license plate light assembly 20. In the preferred embodiment, each of the light assemblies 16, 18 and 20 projects light from a corresponding aperture in the housing 12, as will be described in greater detail below.

A main or first aperture 22 is the largest aperture in the main housing 12, and is constructed and arranged for accommodating the STT light assembly 16, which includes a circuit board 24 and at least one, and preferably a plurality of illuminating elements 26. In the preferred embodiment, the illuminating elements 26 are LEDs; however bulbs or other similar known illuminating elements are contemplated. As is well known in the art, the number and arrangement of the illuminating elements 26 may vary to suit the situation.

Included in the main housing 12 is a support plate 28 securely located in the housing and for supporting the STT light assembly 16. While in the preferred embodiment, the circuit board 24 is a circular disk and the support plate 28 defines a complementary circular recess 30 for accommodating the circuit board, the shapes of the circuit boards and the support plates may vary to suit the application. Also, as is known in the art, a lens 32 is provided for covering the first aperture 22. In the case of STT lights, the lens 32 has a red color, but other colors are contemplated depending on the application.

Besides accommodating the circuit board 24, the recess 30 also includes counterbored apertures 34 for each receiving a corresponding mounting fastener 36, such as a carriage bolt, screw or other fastener known in the art. The fasteners 36 mount the unit 10 to a corresponding bracket (not shown) on the trailer or vehicle employing industry-standard procedures. In addition, the recess 30 is provided with at least one passageway or grommet 38 through which passes lead wires 40 connecting the circuit board 24 to the control circuitry and power source of the vehicle (not shown) as is well known in the art. To maintain a water-tight connection, the wires 40 are connected to the circuit board 24 and subsequently potted with epoxy. At least one standoff support 42 is provided in the recess 30 for contacting an underside of the circuit board 24 for supporting the board above the bottom of the recess.

The support plate 28 is secured in the aperture 22 by mating, frictional engagement between lugs 44 on the housing 12 which engage slots 46 in the plate 28 and optional chemical adhesive or ultrasonic welding, as is well known in the art. It is also contemplated that the respective locations of the lugs 44 and the slots 46 is reversible. Also, since the light unit 10 is contemplated for use in or near water, as with a boat trailer, the components throughout, especially lens/housing connections (except the side marker lights) are preferably ultrasonically welded together for preventing water entry, and the circuit boards, like the board 24, is epoxy coated, as is common in the trailer light industry.

Referring now to FIGS. 1-6A, also included in the housing 12 is a pair of opposed side marker apertures 48, one each disposed on either side wall 50 of the housing 12 adjacent the main aperture 22. In the preferred embodiment, each aperture 48 has three sides, a pair of opposed, generally short sides 52 each defining a slot 54 extending parallel to a plane defined by the side wall 50, and a long side 56. The long side 56 spaces the short sides 52 from each other, is the closest point on the aperture 48 to the lens 32, and extends generally parallel to a plane defined by the circuit board 24. At least one and preferably a pair of spaced, preferably generally planar tabs 58 extending perpendicular to and from the long side 56 and into the side marker aperture 48. An outer surface 60 of each tab 58 is preferably provided with a transverse rib 62 or equivalent locking formation.

The side marker light assembly 18 is constructed and arranged for engagement in a selected one of the side marker apertures 48 and includes a side marker housing 64 dimensioned to fit within the aperture in a snap-fit engagement, preferably without the use of tools. A cavity 66 (FIG. 1) defined by the housing 64 is configured for receiving a side marker circuit board 68 having at least one illuminating element 70, preferably similar to the illuminating elements 26, and is connected via lead wires 72 passing through a passageway (not shown) in the housing 64 to connect to the vehicle control and power system (not shown) as is known in the lighting art. As is the case with the STT circuit board 24, the side marker circuit board 68 is fastened to the respective housing 64 by fasteners 74 preferably threadably engaging bosses 76 in the housing. Also, the connection between the lead wires 72 and the circuit board 68 is sealed with epoxy as is the case with the STT light assembly 16. In addition, a side marker lens 78 is fastened to the housing 64 to cover the illuminating element 70 by a snap-fit engagement or the like and eventually ultrasonically welded to the housing or secured by chemical adhesive as is well known in the art. The side marker lens 78 is typically amber in color; however other colors are contemplated depending on the application.

Figure 6:
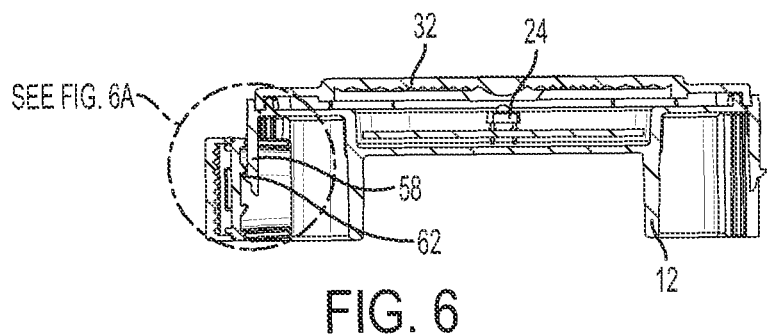
FIG. 6 is a cross-section taken along the line 6-6 of FIG. 3 and in the direction generally indicated.
Figure 6A:
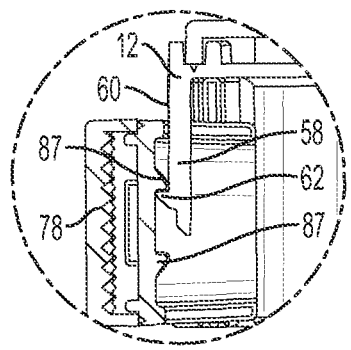
FIG. 6A is a partial enlargement of the structure depicted in FIG. 6.

An underside 80 of the side marker housing 64 defines at least one and preferably a pair of "U"-shaped notches 82, each constructed and arranged to engage a corresponding one of the tabs 58. Thus, the tabs 58 support the side marker light assembly 18 in position in the side marker aperture 48. In addition, the side marker assembly 18, which is preferably modular, and more specifically the housing 64 is also provided with at least one and preferably a pair of arms 84 which provide an engagement with the side marker aperture 48. Each of the arms 84 preferably has a gripping rib 86 extending generally parallel to the tabs 58 and the slots 54 to positively and matingly engage the slots in a snap-fit engagement (FIG. 3), once the side marker assembly 18 is engaged upon the tabs 58. In addition, the transverse ribs 62 on the tabs 58 grippingly engage a corresponding lip 87 on the side marker housing 64 (FIGS. 6, 6A). If desired, additional fasteners such as threaded screws may be used for affixing the side marker assembly to the main housing 12.

The license plate light assembly 20 includes a license plate housing 88 preferably integrally formed with the main housing 12, however a separate fabrication or molding of the housing and attachment via chemical adhesives or ultrasonic welding is contemplated. The license plate housing 88 is located on a wall 89 of the main housing that is between the side walls 50 and adjacent the main aperture 22. A license plate aperture 90 (FIG. 1) is defined by the housing 88 and accommodates a license plate circuit board 92 having at least one illuminating element 94 similar to the illuminating elements 26 and 70 and preferably an LED. The circuit board 92 is secured in place in the housing 88 using fasteners 74 engaging bosses (not shown). Lead wires (not shown) are also sealed with epoxy as described above. A license plate lens 96 is preferably snap-fit onto the housing 88 and secured by ultrasonic welding, adhesive or the like.

It will be seen that the main housing 12 is provided with support ribs 98 which support the fasteners 36 as they attach the light unit 10 to a vehicle or trailer. In addition, the support ribs 98 define the space in which the side marker light assemblies 18 are located.

Referring now to FIGS. 7-11, an alternate embodiment of the present trailer light unit 10 is generally designated 110. Components shared with the unit 10 are designated with identical reference numbers. A main distinction between the unit 10 and the unit 110 is that the latter features an enclosed main housing 112.

Figure 7:
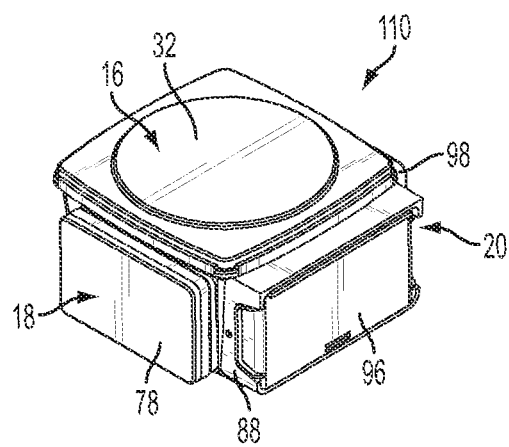
FIG. 7 is a front perspective view of an alternate embodiment of the present light unit.
Figure 8:
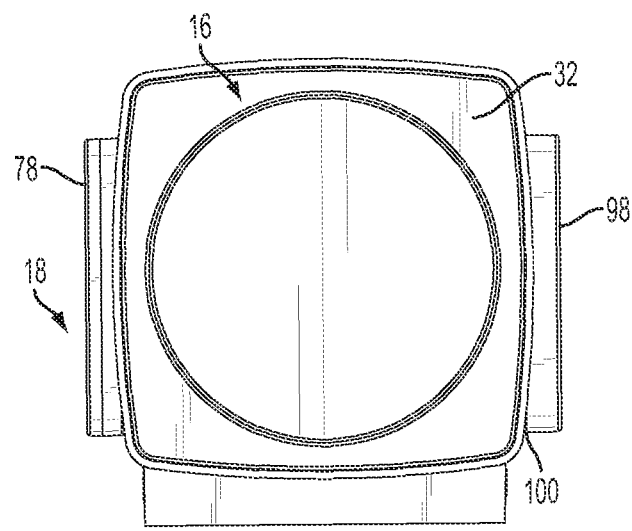
FIG. 8 is a front elevation of the light unit of FIG. 7.
Figure 9:
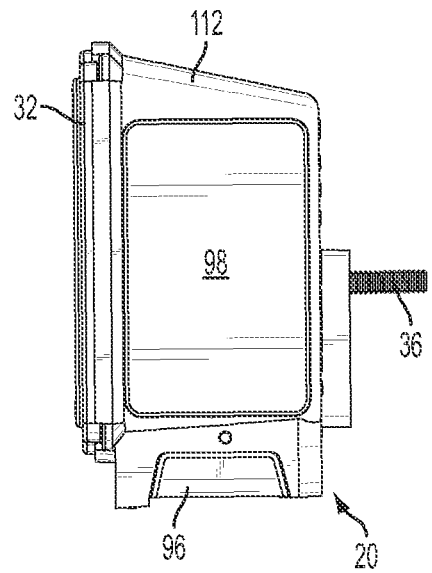
FIG. 9 is a right side elevation of the light unit of FIG. 8.
Figure 10:
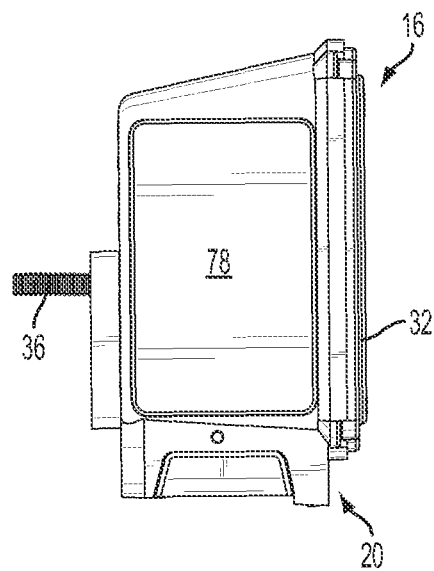
FIG. 10 is a left side elevation of the light unit of FIG. 8.
Figure 11:
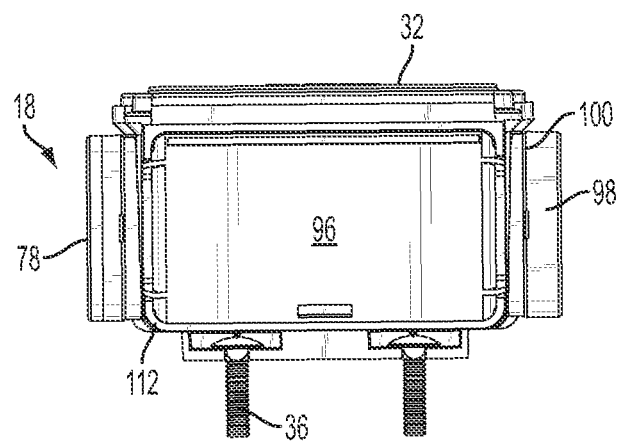
FIG. 11 is a bottom plan view of the light of FIG. 7.

As seen in FIGS. 7, 8 and 11, both of the side marker apertures 48 are occupied, with the left or right side orientation of the side marker light assembly 18 being at the discretion of the user. The present light unit 110 also includes a cover or blank 114 (FIGS. 8, 9) for use in covering the side marker aperture 48 that is not engaged or is unoccupied by the side marker light assembly 18. In the preferred embodiment, the cover 114 is made of plastic having an opaque color. However the material or color of the cover 114 may vary to suit the situation. A peripheral edge 116 of the cover 114 is constructed and arranged to securely attach to the side marker aperture 48 in a snap-fit arrangement. In the preferred embodiment, the peripheral edge 116 is provided with at least one hook projection (not shown) that engages the periphery of the side marker aperture 48. The cover 114 is located in the opposite side marker aperture 48.

In situations where the user needs to change the orientation of the light unit 10 or 110 from a left side unit to a right side unit, or vice versa, the user unsnaps the side marker light assembly 18 from the respective side marker aperture 48 and then, preserving the connection of the lead wires 72 with the side marker circuit board 68, the user moves the side marker light assembly into the opposite side marker aperture. In the embodiment 110, the above-described change is performed internally, in that the side marker assembly 18 is passed within the interior chamber 14 of the main housing from engagement in one aperture 48 to the other. The cover 114 is removed from that second side marker aperture 48 to permit engagement by the side marker light assembly 18. It will be understood that the cover 114 is equally engageable in either of the side marker apertures 48. A feature of the present universal trailer light unit 10, 110 is that the exchange of the side marker light assembly 18 and, where applicable, the cover 98 is accomplished easily by the user without the use of tools.

While a particular embodiment of the present universal trailer light unit has been shown and described, it will be appreciated by those skilled in the art that changes and modifications may be made thereto without departing from the invention in its broader aspects and as set forth in the following claims.

What is claimed:

1. A universal automotive light, comprising:
  a main housing constructed and arranged for accommodating a stop/tail/turn light assembly, a pair of opposed side marker apertures disposed on either side of said stop/tail/turn light assembly; and
  a side marker light assembly constructed and arranged for engagement in a selected one of said side marker apertures; and
  said main housing is further provided with a license plate aperture on a wall located between said side marker apertures and adjacent said first aperture.

2. The light of claim 1 wherein said side marker light assembly is modular.

3. The light of claim 1 further including a license plate light assembly associated with said license plate aperture.

4. The light of claim 1 wherein said main housing is constructed and arranged such that a user can disengage the side marker light assembly from either of said side marker apertures, and move said light assembly for engagement in the other of said side marker apertures, effectively changing a first sided light into a second sided light without the use of tools.

5. The light of claim 1 wherein said side marker light assembly is provided with at least one arm having an engagement in said side marker aperture.

6. The light of claim 1 further including a cover engaged in the one of said side marker apertures not engaged by said side marker light assembly.

7. The light of claim 6 wherein said cover is engageable in either of said side marker apertures using a snap-fit connection.

8. A universal automotive light, comprising:
  a main housing constructed and arranged for accommodating a stop/tail/turn light assembly, a pair of opposed side marker apertures disposed on either side of said stop/tail/turn light assembly;
  a side marker light assembly constructed and arranged for engagement in a selected one of said side marker apertures;
  at least one arm having an engagement in said side marker aperture; and
  a gripping rib extending from said at least one arm for positively engaging said side marker aperture.

9. The light of claim 8 wherein said at least one arm extends parallel to slots formed by corresponding edges of said side marker aperture.

10. A universal automotive light, comprising:
  a main housing constructed and arranged for accommodating a stop/tail/turn light assembly, a pair of opposed side marker apertures disposed on either side of said stop/tail/turn light assembly;
  a side marker light assembly constructed and arranged for engagement in a selected one of said side marker apertures; and
  said main housing further includes at least one tab extending into said side marker aperture for supporting said side marker light assembly in position in said side marker aperture.

11. The light of claim 10 wherein said side marker assembly has at least one notch corresponding to said at least one tab for engaging said tab as said assembly is engaged in said side marker aperture.

12. A universal automotive light, comprising:
  a main housing defining an interior chamber having a first aperture constructed and arranged for accommodating a stop/tail/turn light assembly, a pair of opposed side marker apertures disposed on either side of said first aperture;
  a side marker light assembly constructed and arranged for engagement in a selected one of said side marker apertures, said light assembly being provided with at least one arm for engaging a corresponding one of said side marker apertures; and
  a cover engaged in the one of said side marker apertures not engaged by said side marker light assembly,
  said interior chamber being constructed and arranged so that said side marker light assembly is disengageable from a corresponding one of said side marker apertures, and is passable through said chamber to the other of said side marker apertures for engagement therein.

13. The light of claim 12 wherein said engagement and said disengagement of said side marker light assembly in said side marker apertures is accomplished without the use of tools.

\* \* \* \* \*